United States Patent [19]

Nahas et al.

[11] Patent Number: 4,713,265
[45] Date of Patent: Dec. 15, 1987

[54] PROCESS FOR CURING A COATING COMPOSITION OF AN ACRYLIC POLYMER AND A POLYISOCYANATE WITH AN AMINE VAPOR CATALYST

[75] Inventors: Robert C. Nahas, Voorhees, N.J.; Clifford H. Strolle, Springfield, Pa.

[73] Assignee: E. I. Du Pont de Nemours and Company, Wilmington, Del.

[21] Appl. No.: 931,078

[22] Filed: Nov. 17, 1986

Related U.S. Application Data

[62] Division of Ser. No. 804,134, Dec. 3, 1985, Pat. No. 4,659,799.

[51] Int. Cl.$^4$ .............................................. B05D 3/04
[52] U.S. Cl. .................... 427/341; 427/385.5; 427/393.5
[58] Field of Search ............... 427/385.5, 341, 393.5; 528/49, 53, 54, 65; 525/453, 459

[56] References Cited

U.S. PATENT DOCUMENTS

| 3,851,402 | 12/1974 | Turnbull et al. | 34/47 |
| 3,874,898 | 4/1975 | McInnes et al. | 427/341 |
| 4,145,515 | 3/1979 | Pogozelski et al. | 528/54 X |
| 4,150,211 | 4/1979 | Müller et al. | 528/53 X |
| 4,293,661 | 10/1981 | Probst et al. | 525/127 |
| 4,322,327 | 3/1982 | Yoshimura et al. | 528/49 X |
| 4,374,167 | 2/1983 | Blegen | 428/141 |
| 4,404,324 | 9/1983 | Fock et al. | 528/53 X |
| 4,408,034 | 10/1983 | Kazama et al. | 528/54 |
| 4,425,468 | 1/1984 | Makhlouf et al. | 525/459 X |
| 4,517,222 | 5/1985 | Blegen | 427/30 |

FOREIGN PATENT DOCUMENTS

PF7466 12/1982 Australia .

OTHER PUBLICATIONS

Article-Vapor Cures Coatings without Heat-Applicant Manufacturer, Nov. 1985.

Primary Examiner—Thurman K. Page
Attorney, Agent, or Firm—Hilmar L. Fricke

[57] ABSTRACT

A process for curing a coating composition with a vaporous amine catalyst, wherein the composition has as the binder A. an acrylic polymer containing hydroxyl groups and amine containing groups and has a weight average molecular weight of about 2,000–50,000 and B. an aliphatic polyisocyanate.

13 Claims, No Drawings

PROCESS FOR CURING A COATING COMPOSITION OF AN ACRYLIC POLYMER AND A POLYISOCYANATE WITH AN AMINE VAPOR CATALYST

CROSS REFERENCE TO RELATED APPLICATIONS

This application is a divisional application of Ser No. 804,134 filed Dec. 3, 1985. Now U.S. Pat. No. 4,659,799.

BACKGROUND OF THE INVENTION

This invention is related to a process for curing a coating composition with an amine vapor catalyst.

In modern automobiles and trucks, flexible plastic composites and rubber type substrates are used, for example, for fenders, bumpers, flexible filler panels located between the bumper and the chassis, flexible fender extension around headlights and tail lights and for other flexible exterior trim parts. All of these substrates have the same common problem which is that these substrates cannot withstand the baking temperatures required for curing conventional automotive paints. Paints of two reactive components have been used in which the components are mixed just prior to application which is a cumbersome technique for an automotive and truck assembly plant. Some low temperature bake paints have been used with success. But there is a need for a versatile paint or coating composition that can be fully cured rapidly at ambient temperatures using a vaporous catalyst or baked at low temperatures for a short period of time or cured at ambient temperatures within a relatively short time period.

Vapor curing of coating compositions is well known in the art as shown by Blegen U.S. Pat. No. 4,517,222 issued May 14, 1985 and McInnes et al. U.S. Pat. No. 3,874,898 issued Apr. 1, 1975. However, the compositions shown by these patents are not adequate for automotive and truck manufacturing uses.

SUMMARY OF THE INVENTION

A process for curing a coating composition by exposing the composition to a vaporous amine catalyst; wherein the composition contains about 20-80% by weight of film forming binder and correspondingly, 80-20% by weight of a liquid carrier: the binder, is a blend of A. an acrylic polymer containing hydroxyl groups and amine containing groups of secondary amine groups, tertiary amine groups, pyridine groups, aminoester groups, hydroxy amino ester groups and the polymer has a weight average molecular weight of about 2,000-50,000; and B. an aliphatic polyisocyanate.

DETAILED DESCRIPTION OF THE INVENTION

The coating composition cured by the process of this invention forms a high quality clear or pigmented finish over flexible substrates such as flexible plastic composites and rubbers used in the manufacture of automobiles and trucks. These flexible substrates are used as fenders, filler panels, side panels, fender extensions, moldings and other trim parts. The flexible substrates can be hydrocarbon rubbers such as ethylene/propylene, ethylene/propylene/diene polymers, terpolymer elastomers, polyvinyl chloride, chlorinated rubbers, chlorosulfonated rubber, acrylonitrile/butadiene/styrene polymers, urethane foamed elastomers, thermoplastic urethanes, crystalline and amorphous polyamides, reaction injection molded urethanes and the like. The finish has excellent adhesion to the substrate and is hard, flexible, durable and can be buffed to remove imperfections in the finish and can be sanded for subsequent refinishing.

Preferably, the coating composition used in the process of this invention has as the binder about 40-90% by weight of the acrylic polymer and 10-60% by weight of an aliphatic polyisocyanate.

The acrylic polymer contains both hydroxyl groups and amine containing groups which are secondary amine groups, tertiary amine groups, pyridine groups, aminoester groups and hydroxy amino ester groups.

The polymer has a weight average molecular weight of about 2,000-50,000 and preferably about 5,000-20,000. Molecular weight is determined by gel permeation chromatography using polymethyl methacrylate as the standard.

The acrylic polymer is composed of polymerized monomers of (1) an alkyl methacrylate or an alkyl acrylate or mixtures thereof where the alkyl groups have 1-12 carbon atoms. (2) hydroxy alkyl acrylate or hydroxy alkyl methacrylate or mixtures thereof where the alkyl groups have 2-4 carbon atoms and (3) ethylenically unsaturated amine containing monomers. The acrylic polymer can contain 0.1-50% by weight of styrene.

The acrylic polymer preferably contains polymerized monomers of about (1) 10-30% by weight, based on the weight of the acrylic polymer, of styrene or methyl methacrylate.

(2) 1-25% by weight, based on the weight of the acrylic polymer, of an amine containing ethylenically unsaturated monomer.

(3) 30-70% by weight, based on the weight of the acrylic polymer, of alkyl methacrylate, alkyl acrylate or mixtures thereof, each having 2-12 carbon atoms in the alkyl group, and (4) 20-40% by weight, based on the weight of the acrylic polymer, of hydroxy alkyl acrylate or methacrylate, each having 2-4 carbon atoms in the alkyl group.

Typical alkyl acrylates and methacrylates that can be used to form the acrylic polymer are as follows: methyl methacrylate, ethyl methacrylate, propyl methacrylate, butyl methacrylate, pentyl methacrylate, hexyl methacrylate, octyl methacrylate decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other polymerizable monomers that can be used are styrene, vinyl toluene, acrylamide, methacrylamide, about 0.1-5% by weight of an ethylenically unsaturated carboxylic acid such as methacrylic acid, acrylic acid, itaconic acid. Also, maleate and fumarate esters and esters of itaconic acid can be used.

Typical hydroxy alkyl acrylates and methacrylates that can be used to form the acrylic polymer are as follows: hydroxy ethyl acrylate, hydroxy propyl acrylate, hydroxy butyl acrylate, hydroxy ethyl methacrylate, hydroxy propyl methacrylate and hydroxy butyl methacrylate. Chain extended hydroxy monomers can be used such as caprolactone adducts of the above hydroxy monomer. One useful adduct is of caprolactone and hydroxy ethyl acrylate.

Typical ethylenically unsaturated monomers containing amine groups that can be used to from the acrylic polymer are as follows: t-butyl amino ethyl methacrylate, diethyl amino ethyl methacrylate, ethyl methylamino ethyl methacrylate, t-butyl aminoethyl acrylate, diethylamino ethyl acrylate, ethyl methyl amino ethyl methacrylate, dimethyl amino ethyl methacrylate and dimethyl amino ethyl acrylate, vinyl pyridine, e.g., 2 and 4 vinyl pyridine and vinyl imidazole.

Amino ester groups can be attached to the acrylic polymer by forming the acrylic polymer by forming the acrylic polymer with acrylic acid, methacrylic acid and the like and post reacting the acid, with an alkylene imine such as propylene imine to provide amino ester groups pendent from the carbon-carbon polymer backbone of the formula

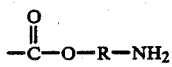

where R is an alkylene group having 2–3 carbon atoms.

The acrylic polymer can contain hydroxy aminoester groups by forming the polymer with glycidyl acrylate or glycidyl methacrylate and then reacting with ammonia. The acrylic polymer and ammonia are charged into a pressure vessel and heated to about 80–150° C. and maintained at a pressure of abut 14–35 kilograms per square centimeter (approximately 200–500 pounds per square inch) for about 1 to 8 hours or until all of the glycidyl groups have been reacted with ammonia. After the reaction of ammonia with the glycidyl groups of the polymer is completed, excess free ammonia is vacuum stripped off. The resulting acrylic polymer has hydroxy amino ester groups pending from the backbone of the polymer.

A preferred acrylic polymer prepared by this method contains about 40–50% by weight methyl methacrylate, 25–45% by weight of an alkyl acrylate or methacrylate such as butyl methacrylate or lauryl methacrylate and 5–20% by weight glycidyl methacrylate or glycidyl acrylate that has been reacted with ammonia to form hydroxy amino ester groups pendent from the carbon-carbon polymer backbone of the formula

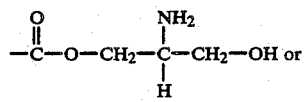

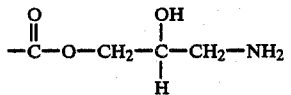

Another preferred acrylic polymer contains sytrene, ethyl methacrylate, lauryl methacrylate, hydroxy ethyl acrylate and methacrylic acid post reacted with propyleneimine or ethyleneimine to provide amino ester groups.

Another preferred acrylic polymer contains styrene, ethyl methacrylate, lauryl methacrylate, hydroxy ethyl acrylate and butyl amino ethyl methacrylate.

Still another preferred acrylic polymer contains styrene, vinyl pyridine, ethyl methacrylate, lauryl methacrylate and hydroxy ethyl acrylate.

The polymerization of the monomers to form the acrylic polymer is carried out by conventional techniques in which the monomers, solvents and polymerization catalyst are charged into a polymerization vessel and reacted at about 50°–200° C. for about 0.5–6 hours to form the polymer.

Typical polymerization catalysts that are used are azobisisobutyronitrile, azo-bis(gamma dimethyl valeronitrile), azo-bis(cyclohexane carbonitrile) are the like.

Typical solvents used are toluene, xylene, ethyl acetate, acetone, methyl ethyl ketone, methyl isobutyl ketone, ethanol, isopropanol and other aliphatic, cycloaliphatic and aromatic hydrocarbon esters, ethers, ketones and alcohols as are conventionally used.

Typical aliphatic polyisocyanates that are used in the coating composition are as follows: isophorone diisocyanate which is 3-isocyanatemethyl-3,3,3-trimethyl-cyclohexyl-isocyanate, propylene-1,2-diisocyanate, butylene-1,2-diisocyanate, butylene-1,3-diisocyanate, hexamethylene diisocyanate, methyl-2,6-diisocyanate, methyl-2,6-diisocyanate caproate, octamethylene diisocyanate, 2,4,4-trimethyl-hexamethylene diisocyanate, nonamethylene diisocyanate, 2,2,4-trimethylhexamethylene diisocyanate, decamethylene diisocyanate, 2,11-diisocyano-dodecane and the like; cycloaliphatic polyisocyanates are included under the term aliphatic polyisocyanates and are as follows: 2,2-methylene-bis-(cyclohexyl isocyanate), 3,3'-methylene-bis-(cyclohexyl isocyanate), 4,4'-methylene-bis-(cyclohexyl isocyanate), 4,4'-ethylene-bis-(cyclohexyl isocyanate), 4,4'-propylene-bis-(cyclohexyl isocyanate).

One particularly preferred aliphatic polyisocyanate that forms a high quality finish is the trimer of hexamethylene diisocyanate.

The coating composition may contain about 0.01–2.0% by weight, based on the weight of binder, of a curing catalyst. The catalysts are usually organo metallics such as dibutyl tin dilaurate, zinc octoate, dibutyl tin di-2-ethylhexoate, stannous octoate, stannous oleate, zinc naphthenate, vanadium acetyl acetonate, and zirconium acetyl acetonate. Stannous octoate is a preferred catalyst.

The coating composition of this invention can be applied by any of the conventional application methods, such as spraying, electrostatic spraying, dipping, brushing, flow-coating and the like. The viscosity of the composition can be adjusted for any of these methods by adding solvents if necessary. Generally, the composition is utilized at a high solids content which keeps air pollution at a minimum level.

After application of the composition to a substrate, the composition is cured rapidly by exposure to an amine vapor catalyst for about 1 to 10 minutes and preferably 1 to 4 minutes at a temperature of about 10° C. to 50° C. This is accomplished by placing the substrate coated with a composition in a chamber containing a high concentration of amine catalyst vapors. Usually, the amine vapors are at a concentration of about 500–3,000 ppm. Alternatively, the amine catalyst vapors may be sprayed to the substrate as the composition is being applied.

After exposure to the amine catalyst, the coated substrate is tempered with a turbulent air stream at about 10–60° C. to remove excess amine from the coating.

Typical amine catalysts that can be used are as follows: tertiary amines containing substituents such as alkyl, alkanol, aryl, cycloaliphatic, and mixtures of such substituents. Additionally, heterocyclic tertiary amines may be suitable for use in the invention also. Representative tertiary amines include, for example, triethyl amine, dimethylethylamine, trimethyl amine, tributyl amine, dimethyl benzyl amine, dimethyl cyclohexyl amine, dimethyl ethanol amine, diethyl ethanol amine, triethanol amine, pyridine, 4-phenylpropyl pyridine, 2,4,6-collidone, quinoline, isoquinoline, N-ethyl morpholine, triethylene diamine, and the like and mixtures thereof. Additionally, it is conceivable to use amine oxides and quaternary ammonium amines depending upon the practicality of providing such amines in the vaporous phase. A myriad of proprietary tertiary amine catalyst currently are available and should function in the process additionally. One preferred catalyst is dimethyl ethanol amine.

Particularly thick coatings of the coating composition can be rapidly cured with the amine catalyst such as coatings 5–20 mils in thickness. It is believed that the presence of the amine groups in the acrylic polymer in combination with the hydroxyl groups provides for rapid curing of thick coatings which cannot be accomplished with prior art compositions.

The coating composition can contain pigments in a pigment to binder weight ratio of about 1/100 to 400/100. These pigments can be introduced into the composition by first forming a mill base with the acrylic polymer utilized in the composition or with other compatible polymers or polymer dispersants by conventional techniques, such as sand-grinding, ball milling, attritor grinding, two roll milling to disperse the pigments. The mill base is blended with the film-forming constituents.

Any of the conventional pigments used in coating compositions can be utilized in the composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic pigments and dyes.

The coating composition can be used as a clear finish over a colored pigmented finish.

To improve weatherability of the clear finish of the coating composition, about 0.1–5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1–5% by weight, based on the weight of the binder, of an antioxidant can be added.

Typical ultraviolet light stabilizers that are useful are as follows:

Benzophenones such as hydroxydodecylbenzophenone, 2,4-dihydroxybenzophenone, hydroxy-benzophenones containing sulfonic acid groups, 2,4-dihydroxy-3'-5'-di-t-butylbenzophenone, 2,2',4'-trihydroxybenzophenone esters of dicarboxylic acids, 2-hydroxy-4-acryloxethoxybenzophenone, aliphatic mono-esters of 2,2',4-trihydroxy-4'-alkoxybenzophenone, 2-hydroxy-4-methoxy-2'-carboxybenzophenone;

Triazoles such as 2-phenyl-4-(2'-4'-dihydroxybenzoyl)triazoles, substituted benzotriazoles such as hydroxyphenyltriazoles such as 2-(2'hydroxy-5'-methylphenyl) benzotriazole, 2-(2'hydroxyphenyl)benzotriazole, 2-(2'-hydroxy-5'-octylphenyl)naphthatriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl) benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlene-substituted oxalic acid diamides, methyl-$\beta$-(3,5-di-t-butyl-4-hydroxyphenyl)propionate, $\alpha$, $\alpha'$-bis(2-hydroxy-phenyl) diisopropylbenzene, 3,5'-dibromo-2'-hydroxy-acetophenone, ester derivatives of 4,4-bis(4'-hydroxy-phenyl)-pentaonic acid wherein there is at least one unsubstituted position ortho to the aromatic hydroxyl groups, organophosphorus sulfides such as bis(diphenyl-phosphinothioyl)monosulfide and bis(diphenyl-phosphinothioyl)disulfide, 4-benzoyl-6-(dialkylhydroxybenzyl)-resorcinol, bis(3-hydroxy-4-benzoylphenoxy)diphenylsilane, bis(3-hydroxy-4-benzoylphenoxy)dialkylsilane, 1,8-naphthalimides, $\alpha$-cyano-$\beta$,$\beta$-diphenylacrylic acid derivatives, bis(2-benzoxazolyl)alkanes, bis(2-naphthoxazolyl)alkanes, methylene malonitriles containing aryl and heterocyclic substitutes, alkylene bis(dithio)carbamate, 4-benzoyl-3-hydroxyphenoxyethyl acrylate, 4-benzoyl-3-hydroxyphenoxyethyl methacrylate, aryl or alkyl-substituted acrylonitriles, 3-methyl-5-isopropylphenyl-6-hydroxycourmarone, 8-acetyl-dodecyl-7,7,9,9-tetramethyl-1,3,8-triazaspiro (4,5)decanol-2,4-dione.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate (5)]-Ni, bis[-phenyldithiocarbamato]-Ni(II), and others listed in the above Patent, column 8, line 44 through line 55.

The following blend of ultraviolet light stabilizers is particularly preferred 2-[2'-hydroxy-3'-5'-1(1-1-dimethyl-propyl)phenyl]benzotriazole and bis-[4-(1,2,2,6,6-pentamethylpiperidyl)] 2-butyl-2-[(3,5-t-butyl-4-hydroxyphenyl)methyl] propanedioate. The stabilizers can be used in any ratio however, a 1:1 ratio of benzotriazole to propanedioate is preferred.

Another useful blend of ultraviolet light stabilizers is 2-(benzotriazole-2-VL)-4,6-bis(methylethyl-1-phenyl ethyl)phenol, and 2(3-hydroxy-3,5'-ditert amyl phenyl) benzotriazole.

Generally, the clear coating composition of this invention is applied by conventional spraying techniques, preferably electrostatic spraying is used, to a color or base coat of an automobile or truck. The coating is cured and the resulting clear coat is about 1–5 mils thick preferably 1–2 mils thick and has excellent gloss, good adhesion to the color coat and excellent weatherability.

The following examples illustrate the invention. All parts and percentages are on a weight basis unless indicated otherwise. Molecular weights are determined by gel permeation chromatography using polymethyl methacrylate as the standard.

EXAMPLE 1

Polymer Solution A was prepared by charging the following constituents into a reaction vessel equipped with a stirer, reflux condenser and a heating mantle:

|  | Parts By Weight |
|---|---|
| Portion 1 | |
| Butyl acetate | 78 |
| Portion 2 | |
| 1,1 Azobis(cyclohexane carbonitrile) | 55 |
| Toluene | 550 |
| Portion 3 | |
| Styrene monomer | 494 |
| Ethyl methacrylate monomer | 494 |
| Lauryl methacrylate monomer | 395 |
| Hydroxy ethyl acrylate monomer | 592 |
| Total | 2658 |

Portion 1 was heated to its reflux temperature. After Portion 2 was mixed, it was added at a rate of 1 ml/min. over an 8 hour period.

Portion 3 was premixed and added simultaneously with portion 2 at a rate of 5 ml/min over a 7 hour period.

The resulting polymer solution had a polymer solids content of 65% and had a Gardner Holdt viscosity measured at 25° C. of Z5. The polymer had the following composition 25% styrene, 25% ethyl methacrylate, 20% lauryl methacrylate, 30% hydroxyethyl acrylate and had an acid number of 1.8 and a weight average molecular weight of 37,000 and a number average molecular weight of 14,000.

Coating composition A was prepared by blending together the following constituents:

|  | Parts By Weight |
|---|---|
| Polymer Solution A (prepared above) | 100.00 |
| "Desmodur" 3390 (isocyanaurate trimer of hexamethylene diisocyanate) | 38.88 |
| Methyl isobutyl ketone | 30.00 |
| Stannous octoate | 0.12 |
| Total | 170.00 |

A 10 mil thick layer of the resulting coating composition was drawn down on a glass panel with a wire wound rod and then placed in a chamber containing a 1500 ppm concentration of dimethyl aminoethanol vapors at 35° C. for about 4 minutes and then air was blown over the panel for about 10 minutes. The resulting film did not cure and remained tacky and soft.

Polymer Solution B prepared by charging the following constituents into a reaction vessel equipped as above:

|  | Parts By Weight |
|---|---|
| Portion 1 | |
| Butyl acetate | 478 |
| Portion 2 | |
| Toluene | 368 |
| 1,1 Azo-bis(cyclohexane carbonitrile) | 55 |
| Portion 3 | |
| 4-Vinyl pyridine monomer | 75 |
| Styrene monomer | 419 |
| Ethyl methacrylate monomer | 494 |
| Lauryl methacrylate monomer | 395 |
| Hydroxy ethyl acrylate monomer | 592 |
| Total | 2876 |

Portion 1 was heated to its reflux temperature. After portion 2 was mixed, it was added at a rate of 1 ml/min over an 8 hour period. Portion 3 was premixed and added simultaneously with portion 2 at a rate of 5 ml/min over a 7 hour period.

The resulting polymer solution had a polymer solids content of 72.7% and had a Gardner Holdt viscosity measured at 25° C. of Z-6.

The polymer had the following composition 3.8% vinyl pyridine 21.2% styrene, 25% ethyl methacrylate, 20% lauryl methacrylate. 30% hydroxyethyl acrylate and had an acid number of 1.8 and a weight average molecular weight of 29,000 and a number average molecular weight of 11,000.

Coating composition B was prepared by blending together the following constituents:

|  | Parts By Weight |
|---|---|
| Polymer Solution B (prepared above) | 100.00 |
| "Desmodur" 3390 (isocyanaurate trimer of hexamethylene diisocyanate) | 38.88 |
| Methyl isobutyl ketone | 30.00 |
| Stannous octoate | 0.12 |
| Total | 170.00 |

A 10 mil thick layer of the resulting coating composition was drawn down on a glass panel with a wire would rod an then placed in a chamber containing a 1500 ppm of dimethyl aminoethanol vapors at 35° C. for about 4 minutes and then air was blown over the panel for about 10 minutes.

The resulting film was tack free, hard and tough and was resistant to solvents such as methyl isobutyl ketone.

Coating composition B was reduced with methyl isobutyl ketone to a spray viscosity of 25 seconds using a No. 2 Zahn cup and sprayed onto primed flexible panels of a reaction injection molded urethane that were coated with a pigmented flexible acrylic basecoat. One coated panel was placed in a chamber containing dimethyl amino ethanol vapors at the above described concentration and temperature for 4 minutes and then air was blown over the panel for 10 minutes. Another coated panel after being exposed to the dimethyl amino ethanol was baked at 82° C. for 5 minutes. A third coated panel was not subjected to the amine vapors but baked at 82° C. for 5 minutes.

In each case a clear coating was formed that was tack free, tough flexible, had a good gloss, had excellent adhesion to the substrate and a pencil hardness of 2H.

EXAMPLE 2

The following constituents were charged into a reaction vessel equipped as in Example 1:

|  | Parts By Weight |
|---|---|
| 4/9 Portion 1 | |
| Methyl amyl ketone | 543.24 |
| Portion 2 | |
| Methyl amyl ketone | 196.80 |
| t-Butyl peracetate | 88.20 |
| Portion 3 | |
| Methacrylic acid monomer | 73.16 |
| Styrene monomer | 354.28 |
| Ethyl methacrylate monomer | 457.47 |
| Lauryl methacrylate monomer | 366.00 |
| Hydroxy ethyl acrylate monomer | 548.88 |
| Total | 2628.03 |

Portion 1 was heated to its reflux temperature. After Portion 2 was mixed, it was added at a rate of 2 ml/min over a 165 minute period. Portion 3 was premixed and added simultaneously with Portion 2 at a rate of 13 ml/min over a 150 minute period.

The resulting polymer solution had a polymer solids content of 69% and had a Gardner Holdt viscosity measured at 25° C. of 2-4. The polymer had the following composition 4.1% methacrylic acid, 19.7% styrene, 25.4% ethyl methacrylate, 20.3% lauryl methacrylate, 30.5% hydroxyethyl acrylate and had an acid number of about 30, a hydroxyl number of about 180 and a weight average molecular weight of 9,500 and a number average molecular weight of 5,000.

The above polymer solution was reacted with propylene imine as follows to form an iminated polymer solution:

|  | Parts By Weight |
|---|---|
| Portion 1 | |
| Polymer solution (prepared above) | 200.0 |
| Portion 2 | |
| Isopropanol | 800.0 |
| Propyleneimine | 40.8 |
| Total | 1040.8 |

Portion 2 was premixed and then added to Portion 1 and heated to 60° C. and held at this temperature for 8 hours. An acetic acid solution was added to react with any residual propylene imine and then the resulting by product was stripped off using conventional techniques.

A coating composition C was prepared by blending the following constituents:

|  | Parts By Weight |
|---|---|
| Portion 1 | |
| Polymer Solution B (prepared in Example 1) | 46.4 |
| Portion 2 | |
| Iminated polymer solution (prepared above) | 46.4 |
| Methyl isobutyl ketone | 40.0 |
| Acetyl acetone | 4.0 |
| "Desmodur" 3390 (described in Example 1) | 38.8 |
| Portion 3 | |
| Stannous Octoate | 0.2 |
| tr Total | 175.67 |

Portion 2 was premixed and blended with Portion 1 and then Portion 3 was added and mixed to form a coating composition.

The resulting composition was reduced to a spray viscosity with methyl isobutyl ketone and sprayed onto primed steel panels. One coated panel was allowed to dry and cure at ambient temperatures. The coating was tack free in about 30 minutes and after 6 hours had a pencil hardness of 2H. A second coated panel was flash dried for about 8 minutes and then baked for 5 minutes at 82° C. The resulting coating was about 2 mils thick and had a pencil hardness of 2H.

A vapor curable composition was formed by blending together the following constituents:

|  | Parts By Weight |
|---|---|
| Portion 1 | |
| Iminated polymer solution (prepared above) | 46.4 |
| Polymer solution (prepared in Example 1) | 46.4 |
| Portion 2 | |
| "Desmodur" 3390 (described in Example 1) | 38.8 |
| Methyl isobutyl ketone | 48.7 |
| Portion 3 | |
| Stannous octoate | 0.2 |
| Total | 180.5 |

The resulting coating composition was drawn down on glass panels using a 10 HL blade and flash dried for 2 minutes and placed in a chamber containing about 1500 ppm dimethyl amino ethanol at 38° C. for about 4 minutes and air then was blown over the panels for 10 minutes. A tack free, hard, tough and sandable coating was obtained.

EXAMPLE 3

The following constituents were charged into a reaction vessel equipped as in Example 1:

|  | Parts By Weight |
|---|---|
| Portion 1 | |
| Methyl amyl ketone | 513.00 |
| Portion 2 | |
| Xylene | 550.00 |
| 1,1 Azobis-cyclohexane carbonitrile | 55.00 |
| Portion 3 | |
| Styrene monomer | 375.25 |
| Ethyl methacrylate monomer | 414.75 |
| Lauryl methacrylate monomer | 316.00 |
| Hydroxy ethyl acrylate monomer | 740.00 |
| t-Butyl amino ethyl methacrylate monomer | 157.40 |
| Total | 3121.40 |

Portion 1 was heated to 145° C. and held at this temperature. After Portion 2 was mixed, it was added at a rate of 1 ml/min over an 8 hours period. Portion 3 was premixed and added simultaneously with Portion 2 at a rate of 5 ml/min over a 7 hour period.

The resulting polymer solution had a polymer solids content of about 63% and had a Gardner Holdt viscosity measured at 25° C. of 25 + ¼. The polymer had the following composition: 18.27% styrene, 20.20% ethyl methacrylate, 15.39% lauryl methacrylate, 38.47% hydroxyethyl acrylate and 7.67% t butyl amino ethyl methacrylate had an acid number of 5 and a weight average molecular weight of 37,000 and a number average molecular weight of 6,300.

A coating composition was prepared by blending together the following constituents:

|  | Parts By Weight |
| --- | --- |
| Portion 1 | |
| Polymer solution (prepared above) | 500.00 |
| Tinuvin 900 (hydroxy phenyl benzotriazole U.V. light absorber) | 15.35 |
| Tinuvin 292 (hindered amine light stabilizer) | 11.55 |
| Methyl isobutyl ketone | 360.00 |
| Portion 2 | |
| "Desmodur" 3390 (described in Example 1) | 194.30 |
| Stannous octoate | 1.00 |
| Ethyl acetate (urethane grade) | 200.00 |
| Total | 1282.20 |

Portion 1 was mixed and then portion 2 was mixed and added to portion 1 and thoroughly mixed with portion 1.

The resulting composition was sprayed onto a primed steel substrate coated with a silver acrylic enamel base coat and then placed in a chamber containing about 1500 ppm of dimethyl aminoethanol at 38° C. for about 4 minutes. Air was blown over the panel for about 10 minutes. Thee resulting clear coating was about 2.0–2.2 mils thick, had excellent tape adhesion, sandability, gloss and hardness.

The above coating composition was sprayed onto another primed steel panel coated with a water based silver acrylic enamel base coat and flash dried for about 8 minutes and then baked for 5 minutes at about 82° C. The resulting clear coating was about 2.0–2.2 mils thick, had excellent adhesion to the base coat, good gloss and hardness.

The above coating composition was sprayed onto a third panel of a primed flexible panel of a reaction injection molded urethane coated with a white pigmented flexible acrylic base coat and placed in an amine containing chamber, described above, for same time and temperature as shown above and air was blown over the panels for 10 minutes. The resulting clear coating was about 2.0–2.2 mils thick, had excellent adhesion to the base coat, good gloss and hardness.

We claim:

1. A process comprising (1) applying a coating composition to a substrate and (2) exposing the composition to a vaporous amine catalyst to cure the composition; wherein the composition comprises about 20°80% by weight of film forming binder and correspondingly about 80°20% by weight of a liquid carrier; wherein the binder consists essentially of
    (a) an acrylic polymer containing hydroxyl groups and amine containing groups selected from the group consisting of secondary amine groups, tertiary amine groups, pyridine groups, amino ester groups, hydroxy aminoester groups and the polymer has a weight average molecular weight of about 2,000–50,000 determined by gel permeation chromatography using tolymethyl methacrylate as the standard and wherein the acrylic polymer consists essentially of (1) polymerized monomers of an alkyl methacrylate or an alkyl acrylate and mixtures thereof wherein the alkyl groups have 1–12 carbon atoms, (2) polymerized monomers of hydroxyl alkyl methacrylate or hydroxy alkyl acrylate or mixtures thereof wherein the alkyl groups have 2–4 carbon atoms and (3) polymerized ethylenically unsaturated amine containing monomer; and
    (b) an aliphatic polyisocyanate.

2. The process of claim 1 in which the coating composition is exposed to the vaporous amine catalyst for about 1–10 minutes at a temperature of about 10–50°C.

3. The process of claim 1 in which the vaporous amine catalyst is at a concentration of about 500–3,000 ppm.

4. The process of claim 2 in which after the coating composition is exposed to the amine catalyst an air stream at about 10–60° C. is passed over the composition to remove excess amine.

5. The process of claim 1 in which the coating composition is exposed to the vaporous amine catalyst at a concentration of about 500–3,000 ppm for about 1–4 minutes at a temperature of about 10–50° C. and after the exposure an air stream at about 10–60° C. is passed over the composition to remove excess amine.

6. The process of claim 5 in which the amine is a tertiary amine.

7. The process of claim 5 in which the amine is dimethyl amino ethanol.

8. The process of claim 1 in which the acrylic polymer of the coating composition contains about 0.1–50% by weight of polymerized styrene.

9. The process of claim 1 in which the binder of the coating composition consists essentially of 40–90% by weight of the acrylic polymer and 10–60% by weight of aliphatic polyisocyanate.

10. The process of claim 5 in which the acrylic polymer of the coating composition consists essentially of polymerized constitutents of about
    (1) 10–30% by weight, based on the weight of the acrylic polymer, of styrene or methyl methacrylate.
    (2) 1–25% by weight, based on the weight of the acrylic polymer, of an amine containing ethylenically unsaturated monomers.
    (3) 30–70% by weight, based on the weight of the acrylic polymer, of alkyl methacrylate, alkyl acrylate or mixtures thereof, each having 2–12 carbon atoms in the alkyl group and
    (4) 20–40% by weight, based on the weight of the acrylic polymer, of hydroxy alkyl acrylate or hydroxy alkyl methacrylate, each having 2–4 carbon atoms in the alkyl group.

11. The process of claim 5 in which the acrylic polymer of the coating composition consists essentially of styrene, vinyl pyridine, ethyl methacrylate, lauryl methacrylate and hydroxy ethyl acrylate, the aliphatic polyisocyanate is the trimer of hexamethylene diisocyanate and the vaporous amine catalyst is dimethyl amino ethanol.

12. The process of claim 5 in which the acrylic polymer of the coating composition consists essentially of styrene, ethyl methacrylate, lauryl methacrylate, hydroxy ethyl acrylate and methacrylic acid post reacted with propylene imine to form pendent amino ester groups, the aliphatic polyisocyanate is the trimer of hexamethylene diisocyanate and the vaporous amine catalyst is dimethyl amino ethanol.

13. The process of claim 5 in which the acrylic polymer of the coating composition consists essentially of styrene, ethyl methacrylate, lauryl methacrylate, hydroxy ethyl acrylate and butyl amino ethyl methacrylate, the aliphatic polyisocyanate is the trimer of hexamethylene diisocyanate and the vaporous amine is dimethyl amino ethanol.

* * * * *